United States Patent
Jiang et al.

(10) Patent No.: US 12,265,510 B1
(45) Date of Patent: Apr. 1, 2025

(54) SYSTEMS AND METHODS FOR ENSURING PROCESSING UNIT HARDWARE STATE INTEGRITY IN LIVE MIGRATION

(71) Applicant: ATI Technologies ULC, Markham (CA)

(72) Inventors: Yinan Jiang, Markham (CA); Dmytro Chenchykov, Markham (CA); Shaoyun Liu, Markham (CA); Vignesh Chander, Markham (CA)

(73) Assignee: ATI Technologies ULC, Markham (CA)

(*) Notice: Subject to any disclaimer, the term of this patent is extended or adjusted under 35 U.S.C. 154(b) by 0 days.

(21) Appl. No.: 18/478,895

(22) Filed: Sep. 29, 2023

(51) Int. Cl.
G06F 16/00 (2019.01)
G06F 16/21 (2019.01)
G06F 21/64 (2013.01)

(52) U.S. Cl.
CPC .......... G06F 16/214 (2019.01); G06F 21/64 (2013.01)

(58) Field of Classification Search
CPC .............................. G06F 16/214; G06F 21/64
See application file for complete search history.

(56) References Cited

U.S. PATENT DOCUMENTS

| | | | |
|---|---|---|---|
| 11,169,835 B1 | 11/2021 | Duong et al. | |
| 2006/0126468 A1* | 6/2006 | McGovern | G06F 21/64 369/47.1 |
| 2009/0204718 A1* | 8/2009 | Lawton | G06F 9/5077 711/6 |
| 2013/0097296 A1* | 4/2013 | Gehrmann | G06F 9/4856 709/223 |
| 2019/0266148 A1* | 8/2019 | Dhuse | G06F 16/137 |
| 2023/0246818 A1* | 8/2023 | Peddada | H04L 9/0825 713/171 |

OTHER PUBLICATIONS

International Search Report and Written Opinion in PCT Application No. PCT/IB2024/055914 mailed Sep. 17, 2024, By: Authorized Officer: Kathryn Marcynuk.

* cited by examiner

*Primary Examiner* — Diedra McQuitery
(74) *Attorney, Agent, or Firm* — Greenberg Traurig, LLP

(57) ABSTRACT

A computer-implemented method for ensuring processing unit hardware state integrity in live migration can include participating as a source, by a processing unit, in a live migration procedure by injecting, into a live migration data package containing a state of the processing unit, a signature verifying the state. The method can additionally include participating as a target, by the processing unit, in an additional live migration procedure migrating an additional live migration data package containing an additional state of an additional processing unit by performing an integrity check based on an additional signature, in the additional live migration data package, verifying the additional state. Various other methods, systems, and computer-readable media are also disclosed.

20 Claims, 13 Drawing Sheets

SYSTEMS AND METHODS FOR ENSURING PROCESSING UNIT HARDWARE STATE INTEGRITY IN LIVE MIGRATION

BACKGROUND

In a live migration process, the hypervisor does not provide a scheme to guarantee the integrity of data migrated from the source co-processing unit (e.g., graphics processing unit (GPU), accelerator processing unit (APU), compute processor, tensor, neural network (NN) processor, etc.) to the target co-processing unit before the migrated data is applied on the target GPU. If the migrated data has been corrupted, the VF on the target GPU will encounter GPU hang. If the migrated data has been tampered with, restoring such migrated data can lead to a possible attack through the tampered firmware (FW).

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
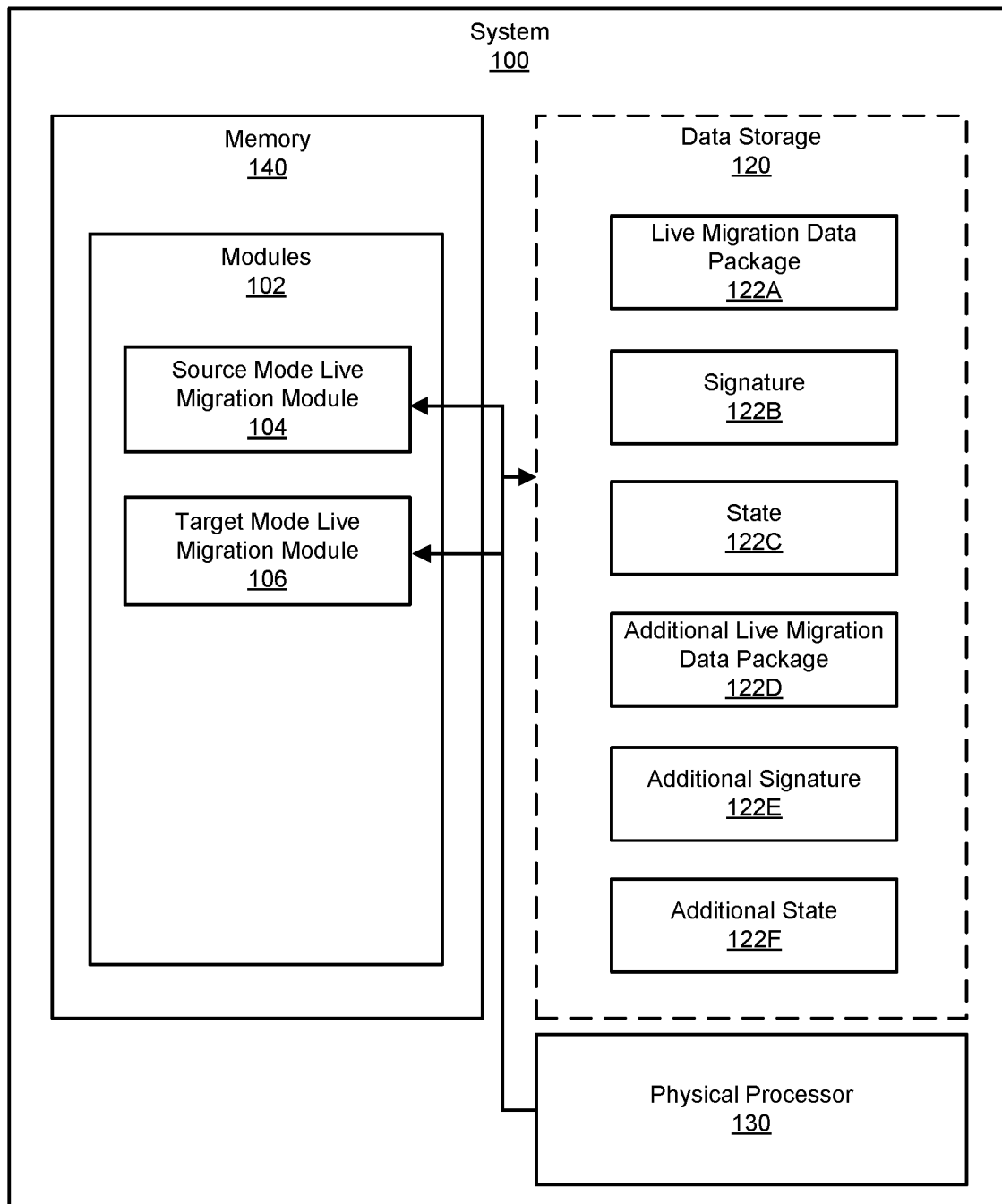
FIG. 1 is a block diagram of an example system for ensuring processing unit hardware state integrity in live migration.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for ensuring processing unit hardware state integrity in live migration. For example, the disclosed systems and methods can ensure data integrity of co-processing unit state data transferred during live migration of a virtual function at a hardware level. For example, firmware running in a trusted micro-processor on a source co-processing unit can receive a request from a driver of the source co-processing unit to create live migration data. In response to the request, the firmware running in a trusted micro-processor can collect one or more data blobs that include co-processing unit state data to be included in a live migration data package, generate an integrity signature for each of the one or more data blobs, and inject the integrity signatures into the live migration data package. Additionally, firmware running in a trusted micro-processor in a destination co-processing unit can receive the live migration data package from a driver of the destination co-processing unit, use the integrity signatures to perform integrity checks on each of the one or more data blobs, and restore the co-processing unit state data on the destination co-processing unit in response to the integrity checks proving successful. Otherwise, a data blob that fails an integrity check can be dropped, causing the live migration to fail. A co-processing unit firmware running in a trusted micro-processor can be capable of performing as both the source co-processing unit firmware and the destination co-processing unit firmware.

The disclosed systems and methods can achieve numerous benefits. For example, the disclosed systems and methods can guarantee that all data migrated from a source co-processing unit to a destination co-processing unit is valid and will not cause any co-processing unit to hang or any security concern. The disclosed systems and methods can also guarantee the run-time context for a co-processing unit engine and execution environment are not altered during or after migration. As a result, applications that rely on the context can resume their execution without any need for re-initialization.

In one example, a computing device includes source mode live migration circuitry configured to participate in a live migration procedure by injecting, into a live migration data package containing a state of a processing unit implementing the source mode live migration circuitry, a signature verifying the state, and target mode live migration circuitry configured to participate in an additional live migration procedure migrating an additional live migration data package containing an additional state of an additional processing unit by performing an integrity check based on an additional signature, in the additional live migration data package, verifying the additional state.

Another example can be the previously described example computing device, wherein the source mode live migration circuitry is configured to receive a request, from a host driver, to create the live migration data package, collect, in response to the request, one or more data blobs that include the state of the processing unit, generate integrity signatures including an integrity signature for each of the one or more data blobs, and inject the integrity signatures into the live migration data package.

Another example can be any of the previously described example computing devices, wherein the target mode live migration circuitry is configured to participate in the additional live migration procedure by receiving, from a host driver, the additional live migration data package, and respond to receipt of the additional live migration data package by performing the integrity check of the additional state of the additional processing unit based on the additional signature injected, by the additional processing unit, into the additional live migration data package.

Another example can be any of the previously described example computing devices, wherein the target mode live migration circuitry is configured to participate in the additional live migration procedure by restoring, based on the integrity check, the additional state of the additional processing unit on the processing unit.

Another example can be any of the previously described example computing devices, wherein the target mode live migration circuitry is configured to restore the state of the additional processing unit on the processing unit in response to the integrity check proving successful.

Another example can be any of the previously described example computing devices, wherein the target mode live migration circuitry is configured to drop a data blob of the additional live migration data package that fails the integrity check, thereby causing restoration of the state of the additional processing unit on the processing unit to fail.

Another example can be any of the previously described example computing devices, wherein the computing device corresponds to at least one of the processing unit or one or more micro-processors configured for implementation in the processing unit.

In one example, a server system includes a co-processing unit configured to participate as a source in a live migration procedure by injecting a signature, into a live migration data package containing a state of the co-processing unit, verifying the state and participate as a target in an additional live migration procedure by performing an integrity check based on an additional signature, verifying an additional state of an additional co-processing unit, in an additional live migration data package, and a host driver configured to trigger the co-processing unit to participate as the source by transmitting a request to create the live migration data package and trigger the co-processing unit to participate as the target by transmitting the additional live migration data package.

Another example can be the previously described example server system, wherein the co-processing unit is configured to participate as the source by collecting, in response to the request, one or more data blobs that include the state of the co-processing unit, generating integrity signatures including an integrity signature for each of the one or more data blobs, and injecting the integrity signatures into the live migration data package.

Another example can be any of the previously described example server systems, wherein the co-processing unit is configured to participate as the target by performing the integrity check, in response to receipt of the additional live migration data package, of the additional state of the additional co-processing unit based on the additional signature injected, by the additional co-processing unit, into the additional live migration data package.

Another example can be any of the previously described example server systems, wherein the co-processing unit is configured to participate as the target by restoring, based on the integrity check, the additional state of the additional co-processing unit on the co-processing unit.

Another example can be any of the previously described example server systems, wherein the co-processing unit is configured to participate as the target by restoring the state of the additional co-processing unit on the co-processing unit in response to the integrity check proving successful.

Another example can be any of the previously described example server systems, wherein the co-processing unit is configured to participate as the target by dropping a data blob of the additional live migration data package that fails the integrity check, thereby causing restoration of the state of the additional co-processing unit on the co-processing unit to fail.

In one example, a computer-implemented method can include participating as a source, by a processing unit, in a live migration procedure by injecting, into a live migration data package containing a state of the processing unit, a signature verifying the state, and participating as a target, by the processing unit, in an additional live migration procedure migrating an additional live migration data package containing an additional state of an additional processing unit by performing an integrity check based on an additional signature, in the additional live migration data package, verifying the additional state.

Another example can be the previously described example method, wherein participating as the source includes receiving a request, from a host driver, to create the live migration data package, collecting, in response to the request, one or more data blobs that include the state of the processing unit, generating integrity signatures including an integrity signature for each of the one or more data blobs, and injecting the integrity signatures into the live migration data package.

Another example can be any of the previously described example methods, wherein participating as the target includes receiving, from a host driver, the additional live migration data package, and performing the integrity check, in response to receipt of the additional live migration data package, of the additional state based on the additional signature injected, by the additional processing unit, into the additional live migration data package.

Another example can be any of the previously described example methods, wherein participating as the target includes restoring, based on the integrity check, the additional state of the additional processing unit on the processing unit.

Another example can be any of the previously described example methods, wherein participating as the target includes restoring the state of the additional processing unit on the processing unit in response to the integrity check proving successful.

Another example can be any of the previously described example methods, wherein participating as the target includes dropping a data blob of the additional live migration data package that fails the integrity check, thereby causing restoration of the state of the additional processing unit on the processing unit to fail.

Another example can be any of the previously described example methods, wherein the processing unit corresponds to a co-processing unit.

Figure 2:
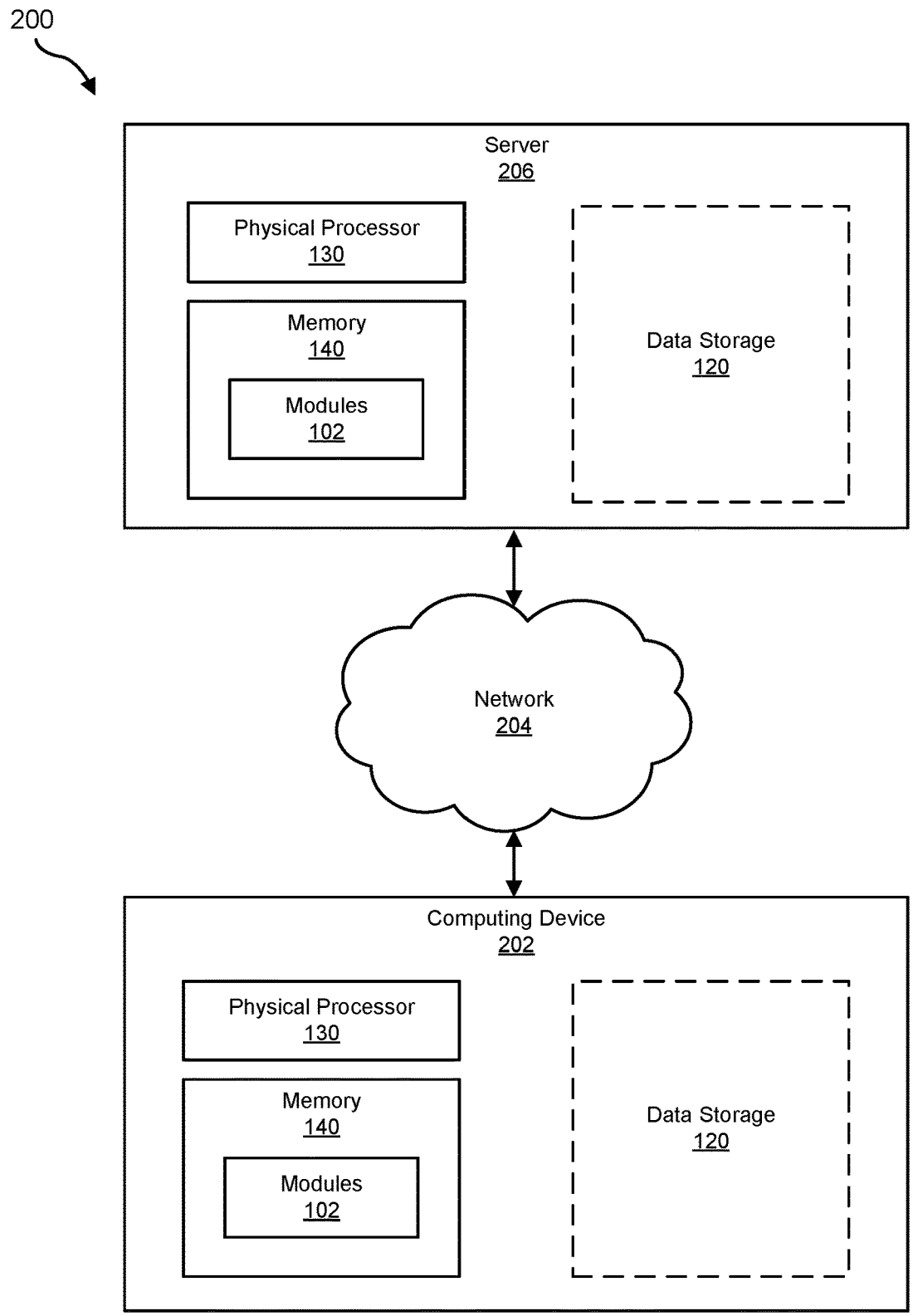
FIG. 2 is a block diagram of an additional example system for ensuring processing unit hardware state integrity in live migration.
Figure 3:
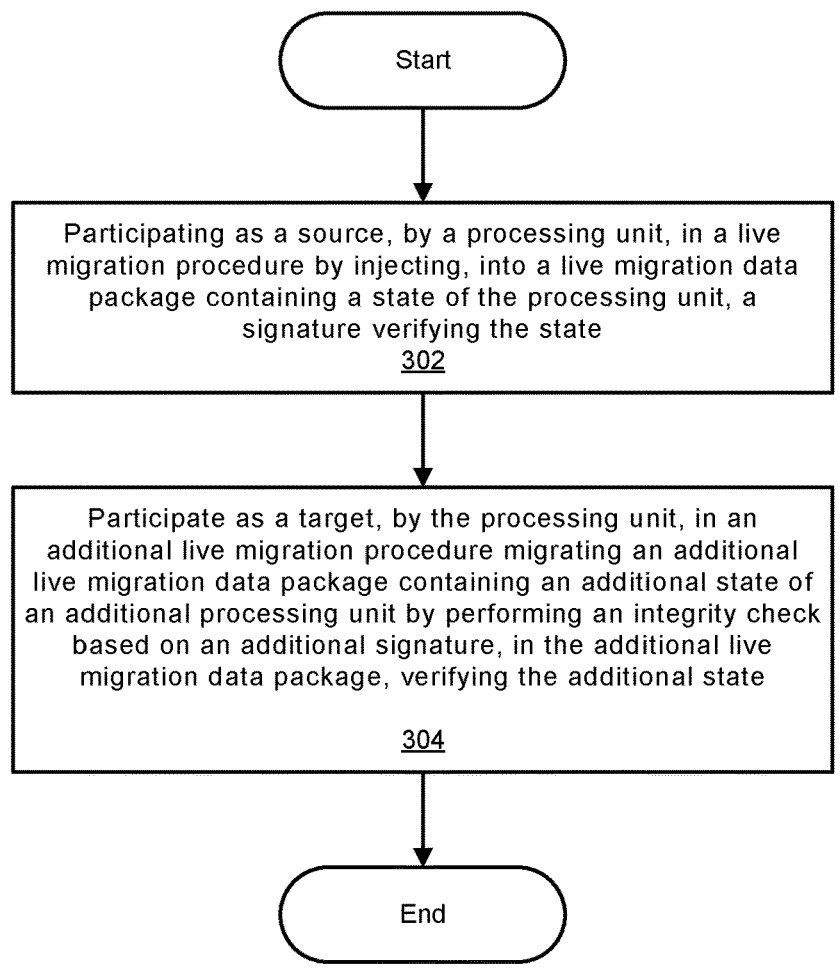
FIG. 3 is a flow diagram of an example method for ensuring processing unit hardware state integrity in live migration.
Figure 4:
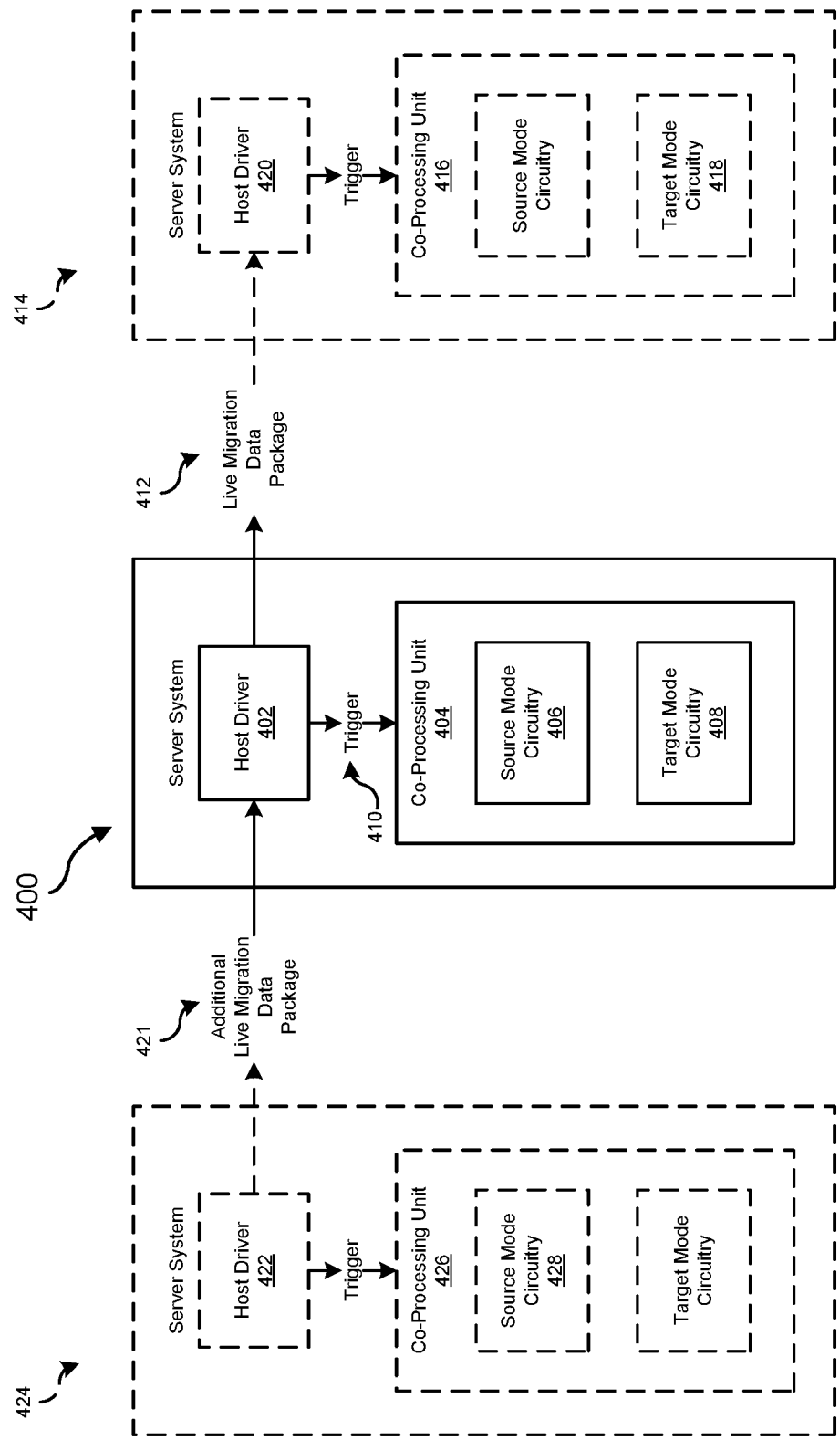
FIG. 4 is a block diagram illustrating a server system for ensuring processing unit hardware state integrity in live migration

The following will provide, with reference to FIGS. 1, 2, and 4, detailed descriptions of example systems for ensuring processing unit hardware state integrity in live migration. Detailed descriptions of corresponding computer-implemented methods will also be provided in connection with FIGS. 3 and 5. In addition, detailed descriptions of example live migration procedures for co-processing units and/or one or more trusted micro-processors thereof will be provided in connection with FIGS. 4-13.

FIG. 1 is a block diagram of an example system 100 for ensuring processing unit hardware state integrity in live migration. As illustrated in this figure, example system 100 can include one or more modules 102 for performing one or more tasks. As will be explained in greater detail below, modules 102 can include a source mode live migration module 104 and a target mode live migration module 106. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof. In some implementations, the modules can be implemented as microcode (e.g., a collection of instructions running on a micro-processor, digital and/or analog circuitry, etc.) and/or one or more firmware in a co-processing unit (e.g., GPU, APU, compute processor, tensor, NN processor, etc.). For example, a module can correspond to a co-processing unit, a trusted micro-processor of a co-processing unit, and/or a portion thereof (e.g., circuitry (e.g., one or more device features sets and/or firmware) of a trusted micro-processor).

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 (e.g., platform security processor) can access and/or modify one or more of modules 102 stored in memory 140. Additionally or alternatively, physical processor 130 can execute one or more of modules 102 to ensure processing unit hardware state integrity in live migration. Examples of physical processor 130 include, without limitation, micro-processors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As illustrated in FIG. 1, example system 100 can also include one or more instances of stored data, such as data storage 120. Data storage 120 generally represents any type or form of stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 include, without limitation, live migration data package 122A, signature 122B, state 122C, additional live migration data package 122D, additional signature 122E, and additional state 122F.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1 can, when executed by a processor of computing device 202 and/or server 206, enable computing device 202 and/or server 206 to ensure processing unit hardware state integrity in live migration.

Computing device 202 generally represents any type or form of computing device capable of reading computer-executable instructions. In some implementations, computing device 202 can be and/or include one or more co-processing units having a chiplet processor connected by a switch fabric. Additional examples of computing device 202 include, without limitation, platforms such as laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device. Alternatively or additionally, computing device 202 can correspond to a device operating within such a platform.

Server 206 generally represents any type or form of platform that provides cloud service (e.g., cloud gaming server) that includes one or more computing devices 202. In some implementations, server 206 can be and/or include a cloud service (e.g., cloud gaming server) that includes one or more co-processing units having a chiplet processor connected by a switch fabric. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, a Peripheral Component Interconnect express (PICe) bus, a Nonvolatile memory express (Nvme) bus, a Local Area Network (LAN), a Personal Area Network (PAN), Power Line Communications (PLC), portions of one or more of the same, variations or combinations of one or more of the same, or any other suitable network that enables the computing device 202 to perform handshaking with other components on the platform of server 206. In other examples, network 204 can be an intranet, a Wide Area Network (WAN), the Internet, a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for ensuring processing unit hardware state integrity in live migration. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

The term "computer-implemented method," as used herein, can generally refer to a method performed by hardware or a combination of hardware and software. For example, hardware can correspond to analog circuitry, digital circuitry, communication media, or combinations thereof. In some implementations, hardware can correspond to digital and/or analog circuitry arranged to carry out one or more portions of the computer-implemented method. In some implementations, hardware can correspond to physical processor 130 of FIG. 1. Additionally, software can correspond to software applications or programs that, when executed by the hardware, can cause the hardware to perform one or more tasks that carry out one or more portions of the computer-implemented method. In some implementations, software can correspond to one or more of modules 102 stored in memory 140 of FIG. 1.

As illustrated in FIG. 3, at step 302 one or more of the systems described herein can participate as a source in a live migration procedure. For example, source mode live migration module 104 can, as part of computing device 202 in FIG. 2, participate as a source, by a processing unit, in a live migration procedure by injecting, into a live migration data package containing a state of the processing unit, a signature verifying the state.

The term "processing unit," as used herein, can generally refer to any processor in a computer. For example, and without limitation, processing unit can refer to a co-processing unit, one or more micro-processors of a co-processing unit, a trusted micro-processor of a co-processing unit, and/or a root of trust (ROT) of a co-processing unit, etc. In this context, ROT can generally refer to a logic block that resides in a silicon die that maintains a trust. For example, and without limitation, a root of trust can maintain a trust using one or more encryption schemes, digital signatures, and/or secret keys. In use, a ROT can be implemented as a source that can always be trusted within a cryptographic system. Because cryptographic security is dependent on keys to encrypt and decrypt data and perform functions such as generating digital signatures and verifying signatures, ROT schemes generally include a hardened hardware module. In this context, a hardware ROT can be the foundation on which all secure operations of a computing system depend. It can contain the keys used for cryptographic functions and enable a secure boot process. It is inherently trusted, and therefore must be secure by design. The most secure implementation of a RoT is in hardware making it immune from malware attacks. As such, it can be a stand-alone security module or implemented as a security module within a processor or system on chip (SoC).

The term "source," as used herein, can generally refer to a hardware device, or portion thereof, from which a virtual machine (VM) is migrating to another hardware device. For example, and without limitation, the source hardware device can be a co-processing unit and/or virtual function (VF) of a server system with respect to which the other hardware device can be a target co-processing unit and/or VF of another server system. In this context, the term "target," as used herein, can refer to the other hardware device (e.g., target co-processing unit and/or VF). A particular co-processing unit and/or VF can be capable of operating as a source when migrating data to a target co-processing unit and/or VF and operating as a target co-processing unit and/or VF when data is being migrated to the particular co-processing unit and/or VF by an additional co-processing unit and/or VF (e.g., operating as a source co-processing unit and/or VF).

The term "live migration," as used herein, can generally refer to a process of moving a virtual machine (VM) running within a co-processing unit device (VF) between different physical servers with limited side effects on a disconnected client. For example, and without limitation, live migration can provide an ability to migrate a VM from one physical host to another when an administrator needs to shut down a physical server for maintenance or upgrade, thus providing a capability for a server downtime to no longer equal application downtime. In this context, seamless live migration can occur when the downtime of a VM during a live migration is not noticeable by an end user. Additionally, a VM with a co-processing unit and/or VF (e.g., source) can perform live migration to a destination platform and continue to operate with a different co-processing unit and/or VF (e.g., target).

The term "inject," as used herein, can generally refer to writing data into a data structure storing a live migration data package. For example, and without limitation, injecting signatures can include concatenating a signature with a corresponding data blob in a list, table, spreadsheet, vector, matrix, tree, or other type of data structure. In this way, signatures can be prepended and/or appended to corresponding data blobs in a live migration data package. In other examples, signatures can be labeled to indicate one or more corresponding data blobs and included in the live migration data package at any location.

The term "signature," as used herein, can generally refer to a mathematical scheme for verifying the authenticity of digital messages or documents. For example, and without limitation, a signature can be a digital signature and/or a code. In some implementations, signatures can be generated using a public key mechanism, a Rivest-Shamir-Adleman (RSA) scheme, asymmetric cryptography, etc.

The term "state," as used herein, can generally refer to a set of data used by a task that can be saved to allow the task to be interrupted and later continued from the same point. For example, and without limitation, state can refer to a hardware state of a virtual machine, context of a virtual function, etc.

Step 302 can be performed in a variety of ways. For example, source mode live migration module 104 can, as part of computing device 202 in FIG. 2, participate as the source by receiving a request, from a host driver, to create the live migration data package. In some of these examples, source mode live migration module 104 can, as part of computing device 202 in FIG. 2, participate as the source by collecting, in response to the request, one or more data blobs that include the state of the processing unit. Alternatively or additionally, source mode live migration module 104 can, as part of computing device 202 in FIG. 2, participate as the source by generating integrity signatures including an integrity signature for each of the one or more data blobs. Alternatively or additionally, source mode live migration module 104 can, as part of computing device 202 in FIG. 2, participate as the source by injecting the integrity signatures into the live migration data package.

At step 304, one or more of the systems described herein can participate as a target in an additional live migration procedure. For example, target mode live migration module 106 can, as part of computing device 202 in FIG. 2, participate as a target, by the processing unit, in an additional live migration procedure migrating an additional live migration data package containing an additional state of an additional processing unit by performing an integrity check based on an additional signature, in the additional live migration data package, verifying the additional state.

The term "integrity," as used herein, can generally refer to completeness, accuracy, and/or quality of data. For example, and without limitation, integrity can refer to data integrity, physical integrity, logical integrity, and/or domain integrity. In this context, the term "verifying," as used herein, can generally refer to capability of a signature to be used to verify data with respect to which it was generated. For example, and without limitation, a signature verifying data can be generated by a ROT based on the data and using one or more encryption schemes, digital signatures, and/or secret keys. Thus, an integrity check can fail if the signature verifying data indicates that the data has been altered, and an integrity check can succeed if a signature verifying data indicates that the data has not been altered.

Step 304 can be performed in various ways. For example, target mode live migration module 106 can, as part of computing device 202 in FIG. 2, participate as the target by receiving, from a host driver, the additional live migration data package. In some of these examples, target mode live migration module 106 can, as part of computing device 202 in FIG. 2, perform the integrity check, in response to receipt of the additional live migration data package, of the additional state based on the additional signature injected, by the additional processing unit, into the additional live migration data package. Alternatively or additionally, target mode live migration module 106 can, as part of computing device 202 in FIG. 2, participate as the target by restoring, based on the integrity check, the additional state of the additional processing unit on the processing unit. Alternatively or additionally, target mode live migration module 106 can, as part of computing device 202 in FIG. 2, participate as the target by restoring the state of the additional processing unit on the processing unit in response to the integrity check proving successful. Alternatively or additionally, target mode live migration module 106 can, as part of computing device 202 in FIG. 2, participate as the target by dropping a data blob of the additional live migration data package that fails the integrity check, thereby causing restoration of the state of the additional processing unit on the processing unit to fail.

The term "restore," as used herein, can generally refer to restarting a saved virtual machine. For example, and without limitation, a virtual machine can be paused, saved, transferred, loaded into memory, and then restored by restarting the virtual machine from its saved state (e.g., context).

FIG. 4 illustrates a server system 400 for ensuring processing unit hardware state integrity in live migration. Server system 400 can have a host driver 402 and a co-processing unit 404. Co-processing unit 404 can have source mode circuitry 406 and target mode circuitry 408. Source mode circuitry 406 and/or target mode circuitry 408 can correspond to one or more micro-processors of the co-processing unit 404, such as a RoT, a micro-processor operating in conjunction with a RoT, etc. Source mode circuitry 406 and target mode circuitry 408 can be implemented in a same micro-processor or in different micro-processors of the co-processing unit 404.

Host driver 402 can trigger 410 source mode circuitry 406 of the co-processing unit 404 to participate in a live migration procedure as a source by transmitting a request to create a live migration data package 412 for transmission to another server system 414 having another co-processing unit 416 with another instance of target mode circuitry 418 operating in a target mode. In this case, source mode circuitry 406 can cause co-processing unit 404 to create the live migration data package 412 containing a state of the co-processing unit 404, inject one or more signatures into the live migration data package 412 that verify the state of the co-processing unit 404, and store the live migration data package 412 in a storage location accessible to the host driver 402. Host driver 402 can then access the live migration data package 412 at the storage location and transmit it to another host driver 420 of the other server system 414.

Alternatively or additionally, host driver 402 can trigger 410 target mode circuitry 408 of co-processing unit 404 to participate in an additional live migration procedure as a target by transmitting an additional live migration data package 421 to the co-processing unit 404. In this case, host driver 402 can first receive the additional live migration data package 421 from an additional host driver 422 of an additional server system 424 having an additional co-processing unit 426 with additional source mode circuitry 428 operating in a source mode. Host driver 402 can store the additional live migration data package 421 in a storage location and the trigger 410 can identify the storage location at which the target mode circuitry 408 can cause co-processing unit 404 to access the additional live migration data package 421. Target mode circuitry 408 can thus cause the co-processing unit 404 to extract the contents of the additional live migration data package 421, verify an additional state of the additional co-processing unit 426 extracted from the package based on an additional signature extracted from the package, and restore the additional state on the co-processing unit 404 in response to successful verification.

Figure 5:
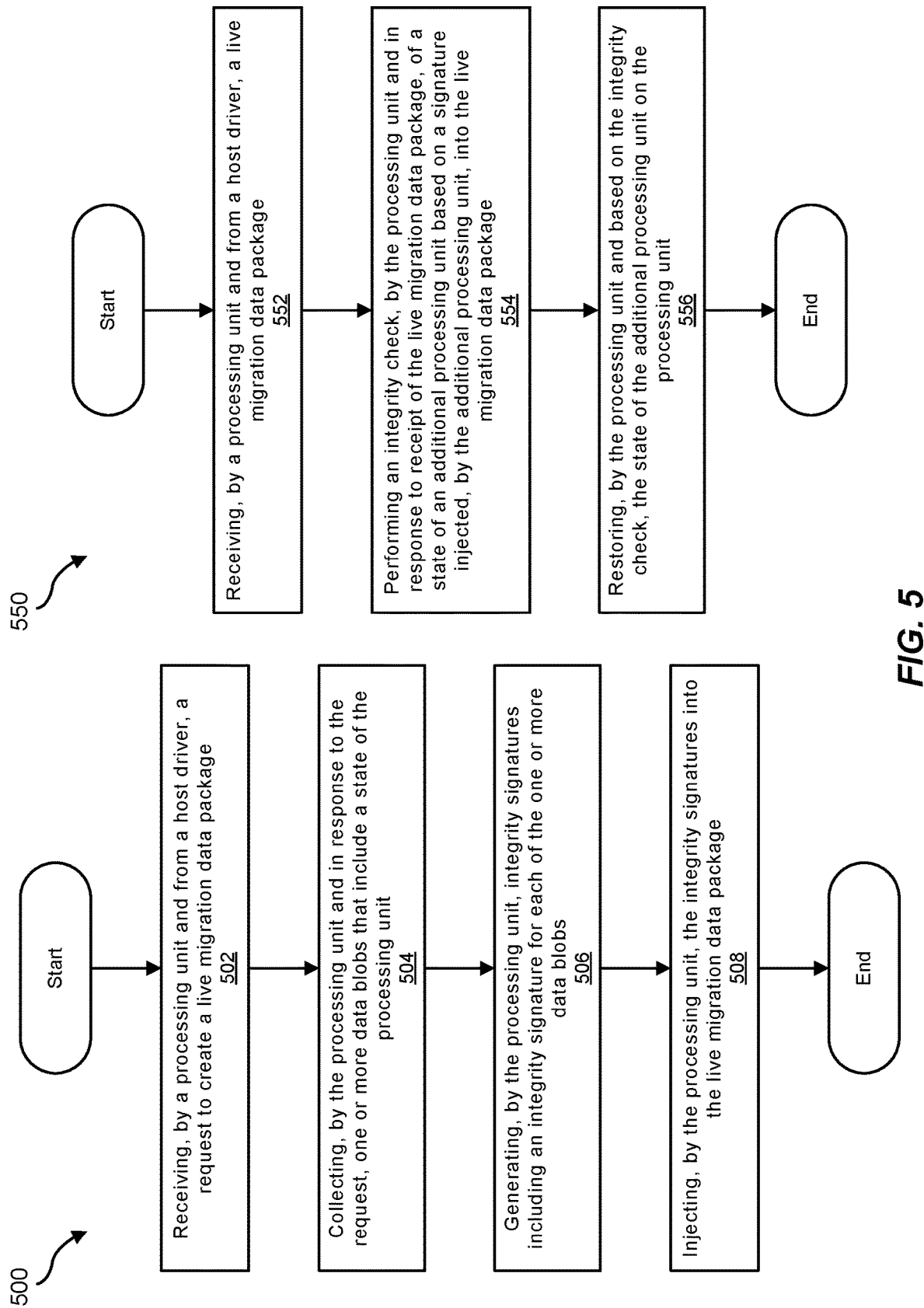
FIG. 5 is a set of flow diagrams illustrating example methods for ensuring processing unit hardware state integrity in live migration.

FIG. 5 illustrates example methods 500 and 550 for ensuring processing unit hardware state integrity in live migration. In some implementations, method 500 can correspond to sub steps of step 302 of FIG. 3 and method 550 can correspond to sub steps of step 304 of FIG. 3. In other implementations, methods 500 and 550 can be performed by different co-processing units and/or trusted micro-processors thereof.

Beginning at step 502, method 500 can include receiving a request. For example, step 502 can include receiving, by a processing unit and from a host driver, a request to create a live migration data package.

The term "host driver," as used herein, can generally refer to a driver of a host operating system. For example, and without limitation, a host driver can correspond to a kernel driver of a host operating system operating as a hypervisor in a virtualized environment. In this context, the processing unit can correspond to a co-processing unit and/or VF containing a guest virtual machine operating in the virtualized environment.

Step 502 can be performed in various ways. For example, the processing unit can receive a request to migrate a VM running on the processing unit and an identification of a storage location at which to store the live migration data package. In other examples, the processing unit can receive the request over a communication medium (e.g., bus) of a server system in which the host driver and the processing unit are implemented and store the request in a storage medium (e.g., RAM) of the processing unit.

At step 504, method 500 can include collecting data. For example, step 502 can include collecting, by the processing unit and in response to the request, one or more data blobs that include a state of the processing unit.

The term "data blobs," as used herein can generally refer to instances of data stored in the processing unit and/or a co-processing unit that includes the processing unit. For example, and without limitation, the data blobs can correspond to data stored in a co-processing unit that includes a trusted micro-processor corresponding to the processing unit, such as data in a frame buffer, data stored in internal registers, data stored in internal SRAM, data stored in various graphics (GFX), direct memory access (DMA), compute, and/or multi-media engines, and/or states of other micro-processors of a co-processing unit that includes the trusted micro-processor.

Step 504 can be performed in various ways. For example, the processing unit can collect the data blobs by accessing multiple storage locations and extracting the data blobs from the multiple storage locations. In some of these implementations, step 504 can include storing the data blobs in a storage medium (e.g., RAM) of the processing unit. In some of these examples, the storage medium can be accessible to the processing unit but not be accessible to the host driver.

At step 506, method 500 can include generating integrity signatures. For example, step 506 can include generating, by the processing unit, integrity signatures including an integrity signature for each of the one or more data blobs.

Step 506 can be carried out in various ways. For example, individual integrity signatures can be generated based on contents of individual data blobs. In some of these implementations, step 506 can include storing the individual integrity signatures in a storage medium (e.g., RAM) of the processing unit. In some of these examples, the storage medium can be accessible to the processing unit but not be accessible to the host driver.

At step 508, method 500 can include injecting integrity signatures. For example, step 508 can include injecting, by the processing unit, the integrity signatures into the live migration data package.

Step 508 can be performed in various ways. For example, the processing unit can transfer the individual data blobs and the individual integrity signatures to the storage location identified by the request. In some of these examples, the processing unit can concatenate the individual integrity signatures with the individual data blobs from which they were generated. In other examples, the individual data blobs and individual integrity signatures can be stored in one or more data structures that indicate which of the individual integrity signatures verify which of the individual data blobs. In still other examples, the individual integrity signatures and/or the individual data blobs can be provided with labels that indicate which of the individual integrity signatures verify which of the individual data blobs. The storage location identified in the request can be accessible to the host driver.

Beginning at step 552, method 550 can include receiving a live migration data package. For example, step 552 can include receiving, by a processing unit and from a host driver, a live migration data package.

Step 552 can be performed in a variety of ways. For example, the processing unit can receive, from the host driver, an identification of a storage location at which the processing unit can access the live migration data package. In some examples, the processing unit can receive the identification over a communication medium (e.g., bus) of a server system in which the host driver and the processing unit are implemented. Additionally, the processing unit can access the storage location, extract contents of the live migration data package, identify correspondence between individual integrity signatures and individual data blobs extracted from the package, and store the individual integrity signatures and individual data blobs in a storage medium (e.g., RAM) of the processing unit. In some of these examples, the storage medium can be accessible to the processing unit but not be accessible to the host driver.

At step 554, method 550 can include performing an integrity check. For example, step 554 can include performing an integrity check, by the processing unit and in response to receipt of the live migration data package, of a state of an additional processing unit based on a signature injected, by the additional processing unit, into the live migration data package.

Step 554 can be performed in a variety of ways. For example, the processing unit can check the integrity of individual data blobs based on their corresponding individual signatures. The particular procedures of the integrity check can vary depending on a particular signature scheme employed, such as signatures generated using a public key mechanism, a Rivest-Shamir-Adleman (RSA) scheme, asymmetric cryptography, etc.

At step 556, method 500 can include restoring a state. For example, step 556 can include restoring, by the processing unit and based on the integrity check, the state of the additional processing unit on the processing unit.

Step 556 can be performed in various ways. For example, the processing unit can restore the state of the additional processing unit on the processing unit in response to the integrity check proving successful. Alternatively, the processing unit can drop a data blob of the additional live migration data package that fails the integrity check, thereby causing restoration of the state of the additional processing unit on the processing unit to fail.

Figure 6:
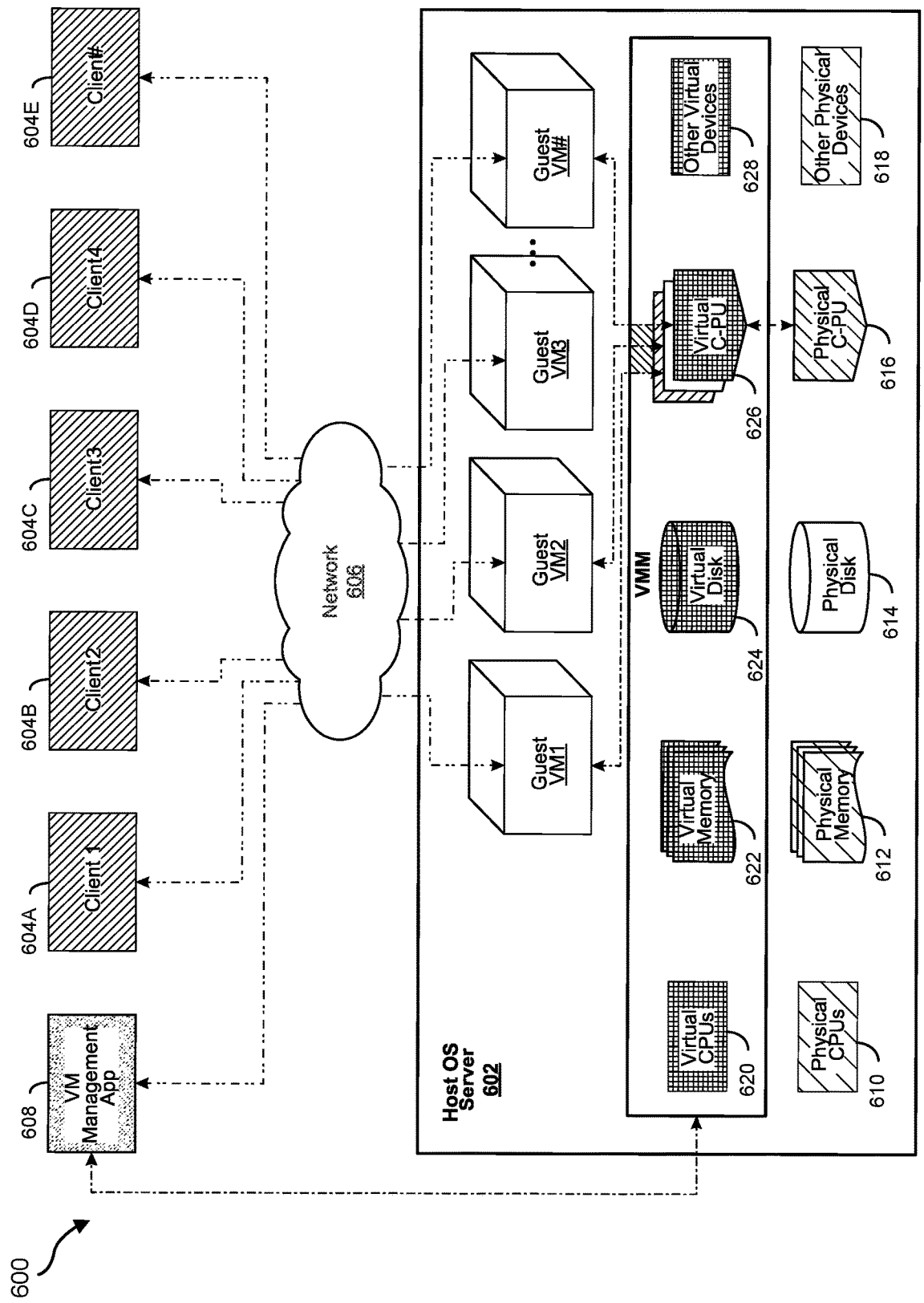
FIG. 6 is a block diagram illustrating an example virtualization system architecture for ensuring processing unit hardware state integrity in live migration.

FIG. 6 illustrates an example virtualization system architecture 600 for ensuring processing unit hardware state integrity in live migration. For example, a host OS server 602, such as server 206 of FIG. 2 and/or server system 400 of FIG. 4, can be connected to a plurality of clients 604A-604E over a network 606. Host OS server 602 can also be connected to a VM management application 608 over network 606. Host OS server 602 can have physical components such as physical CPUs 610, physical memory 612, physical disk 614, physical co-processing unit 616, and other physical devices 618. Host OS server 602 can utilize virtual machine management (VMM) to implement these physical components to host a virtualized environment having virtual CPUs 620, virtual memory 622, virtual disk 624, virtual co-processing units 626, and other virtual devices 628. In this context, the physical co-processing unit 616 can host the virtual co-processing units 626 for guest virtual machines VM1, VM2, VM3, and VM # for the clients 604A-604E. Physical co-processing unit 616 can be configured to ensure processing unit hardware state integrity in live migration in any manner described herein.

Figure 7:
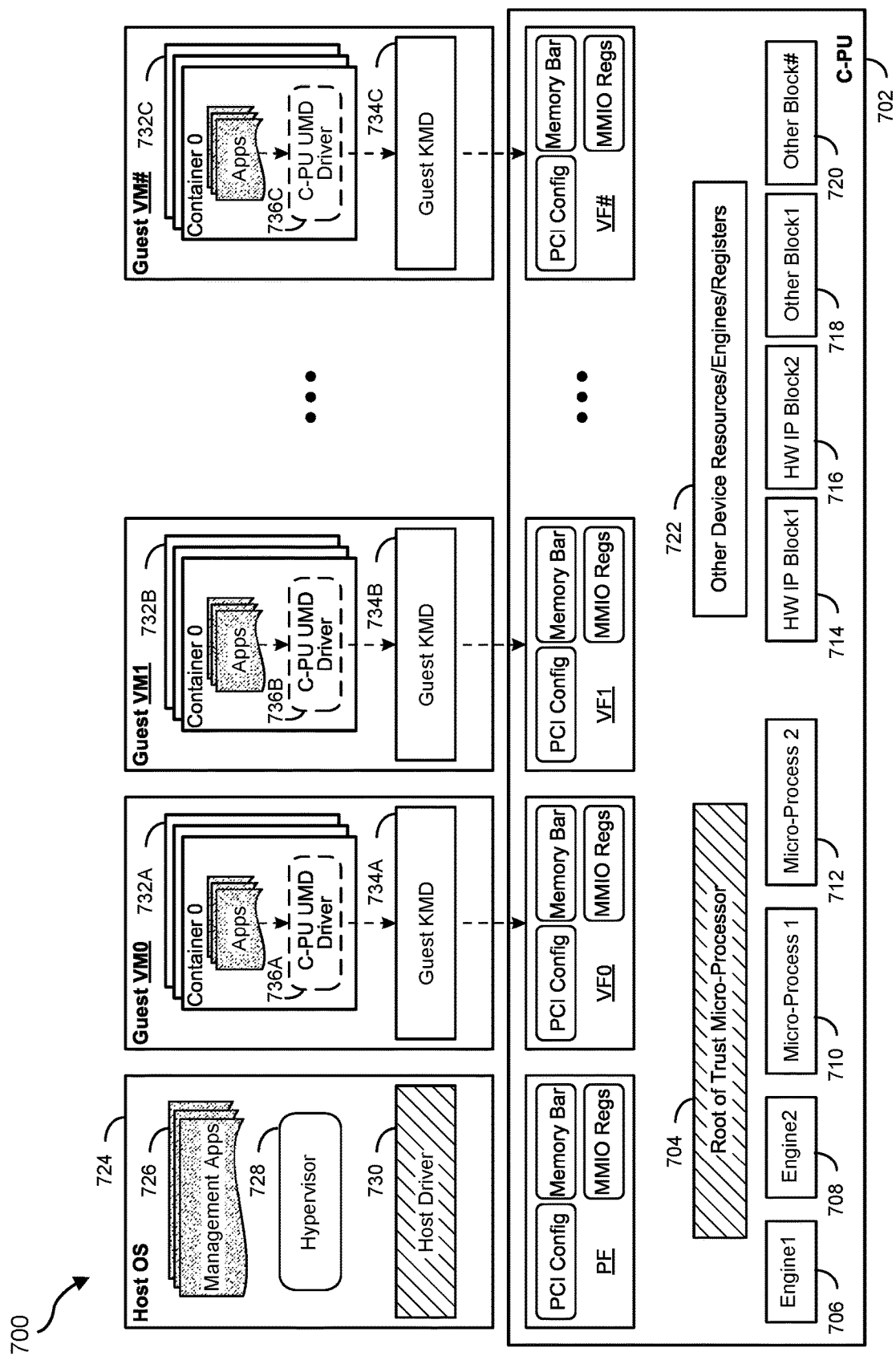
FIG. 7 is a block diagram illustrating an example virtualized environment device driver model for ensuring processing unit hardware state integrity in live migration.

FIG. 7 illustrates an example virtualized environment device driver model 700 for ensuring processing unit hardware state integrity in live migration. For example, co-processing unit 702 can have a root of trust micro-processor 704, a physical function PF, and virtual functions VF0, VF1, and VF #. co-processing unit 702 can additionally have various engines 706 and 708, microprocesses 710 and 712, hardware blocks 714 and 716, other blocks 718 and 720, and other device resources, engines, and/or registers 722. Virtual functions VF0, VF1, and VF # can have various components, such as PCI configurations, memory bars, and MMIO registers as shown. co-processing unit 702 can communicate with a host operating system 724 having management applications 726, hypervisor 728, and host driver 730. Virtual functions VF0, VF1, and VF # can host guest virtual machines VM0, VM1, and VM #, respectively. Guest virtual machines VM0, VM1, and VM # can each have containers 732A-732C and guest kernel mode drivers 734A-734C. Containers 732A-732C can have applications and co-processing unit user mode drivers (UMD) 736A-736C. Thus, virtualized environment device driver model 700 can have various types of drivers, such as host driver 730, guest kernel mode drivers 734A-734C, and co-processing unit UMDs 736A-736C arranged as shown. RoT micro-processor can respond to triggers from host driver 730 by operating in and/or causing co-processing unit 702 to operate in a source mode and/or a target mode in any manner described herein.

Figure 8:
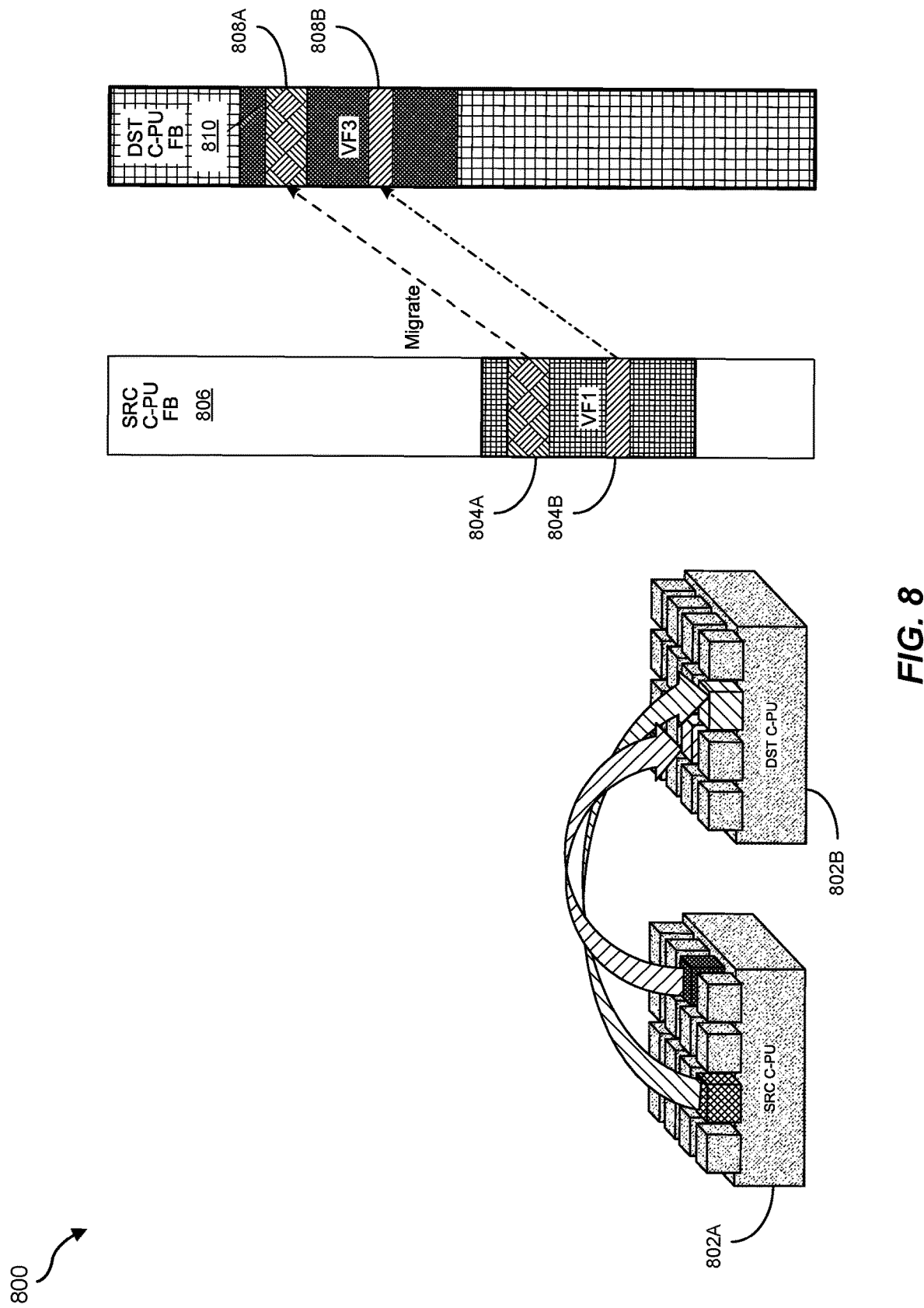
FIG. 8 is a block diagram illustrating an example live migration for a co-processing unit for ensuring processing unit hardware state integrity in live migration.

FIG. 8 illustrates an example live migration 800 for a virtual machine from a source co-processing unit 802A of a server to a target co-processing unit 802B of another server. For example, VM data blobs 804A and 804B in one or more storage locations 806 of the source co-processing unit 802A can be moved, at 808A and 808B, to one or more storage locations 810 of the target co-processing unit 802B. For example, data in a frame buffer, data stored in internal SRAM, data stored in various graphics (GFX), direct memory access (DMA), compute, and/or multi-media engines, and/or states of other micro-processors of the source co-processing unit 802A can migrate to a similar storage location on the target co-processing unit 802B. Each of the source co-processing unit 802A and the target co-processing unit 802B can have their own instance of a trusted micro-processor that can function in any manner described herein to ensure processing unit hardware state integrity in live migration 800.

Figure 9:
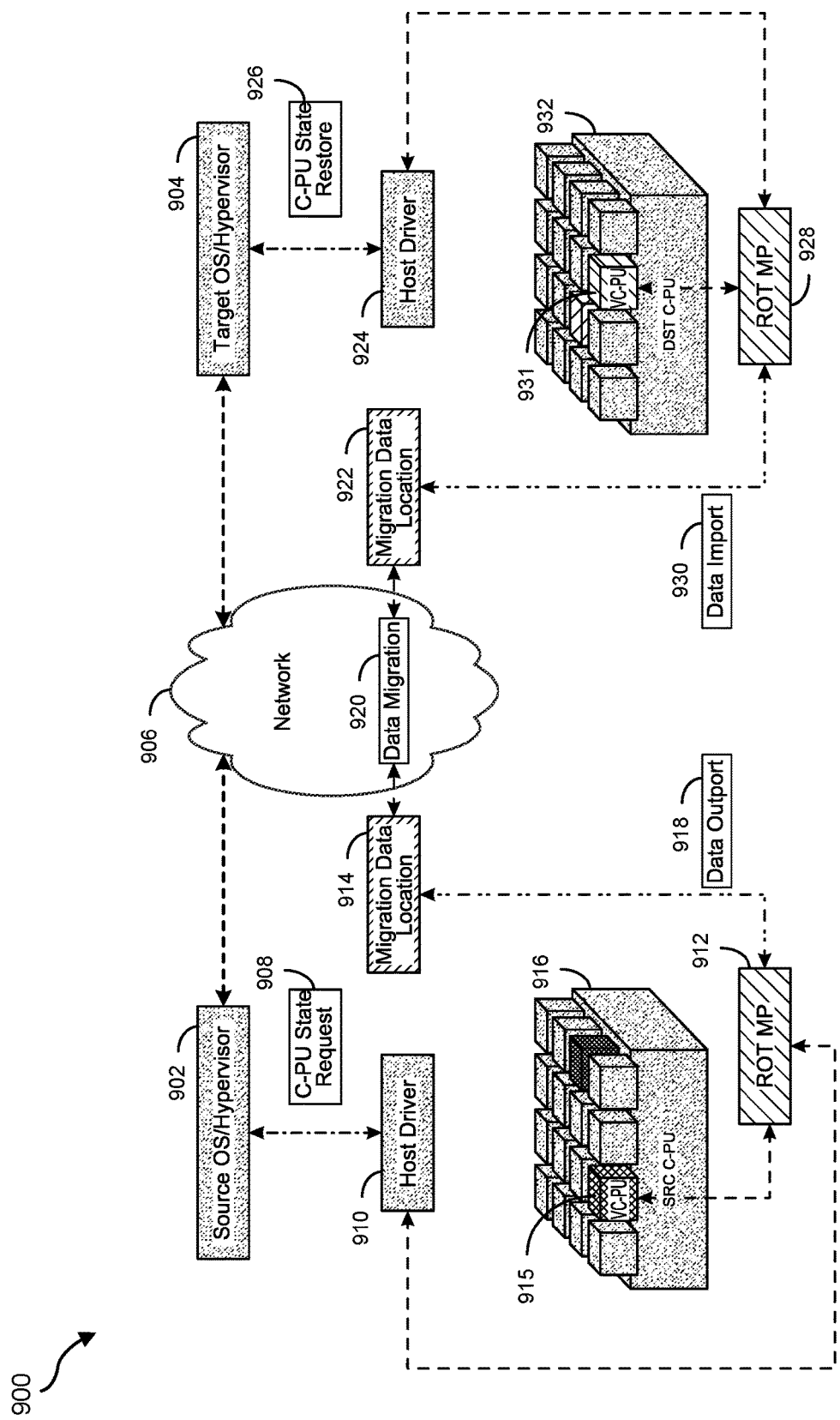
FIG. 9 is a block diagram illustrating an example live migration package data outport and import procedure for ensuring processing unit hardware state integrity in live migration.

FIG. 9 illustrates an example live migration package data outport and import procedure 900 for ensuring processing unit hardware state integrity in live migration. For example, a source operating system hypervisor 902 of a server system can communicate with a target operating system hypervisor 904 of another server system over a network 906. Source operating system hypervisor 902 can send a co-processing unit state request 908 to a host driver 910 (e.g., by calling an application program interface (API) of the host driver 910), which can relay the request 908 to a ROT micro-processor 912 with an identification of a storage location 914 accessible to the host driver 910 and the ROT micro-processor 912. The relay of the request 908 to ROT micro-processor 912 can trigger the RoT micro-processor 912 to operate in a source mode by collecting and signing data blobs representing a state of a source co-processing unit 916 from a virtual co-processing unit 915 of the source co-processing unit 916 and performing data outport 918 of the signed data blobs to the identified storage location 914.

Host driver 910 can access the storage location 914 and perform data migration 920, via source operating system hypervisor 902, target operating system hypervisor 904, and network 906, to another storage location 922 accessible to another host driver 924. Target operating system hypervisor 904 can send a co-processing unit state restore request 926 to the other host driver 924, which can relay the request 926 to another RoT micro-processor 928 with an identification of the storage location 922 accessible to the host driver 924 and the ROT micro-processor 928. The relay of the request 926 to ROT micro-processor 928 can trigger the ROT micro-processor 928 to operate in a target mode by accessing the storage location 922, performing data import 930 from the storage location 922, verifying signed data blobs representing a state of the source co-processing unit 916, and restoring the state of the source co-processing unit 916 on a virtual co-processing unit 931 of the target co-processing unit 932.

Figure 10:
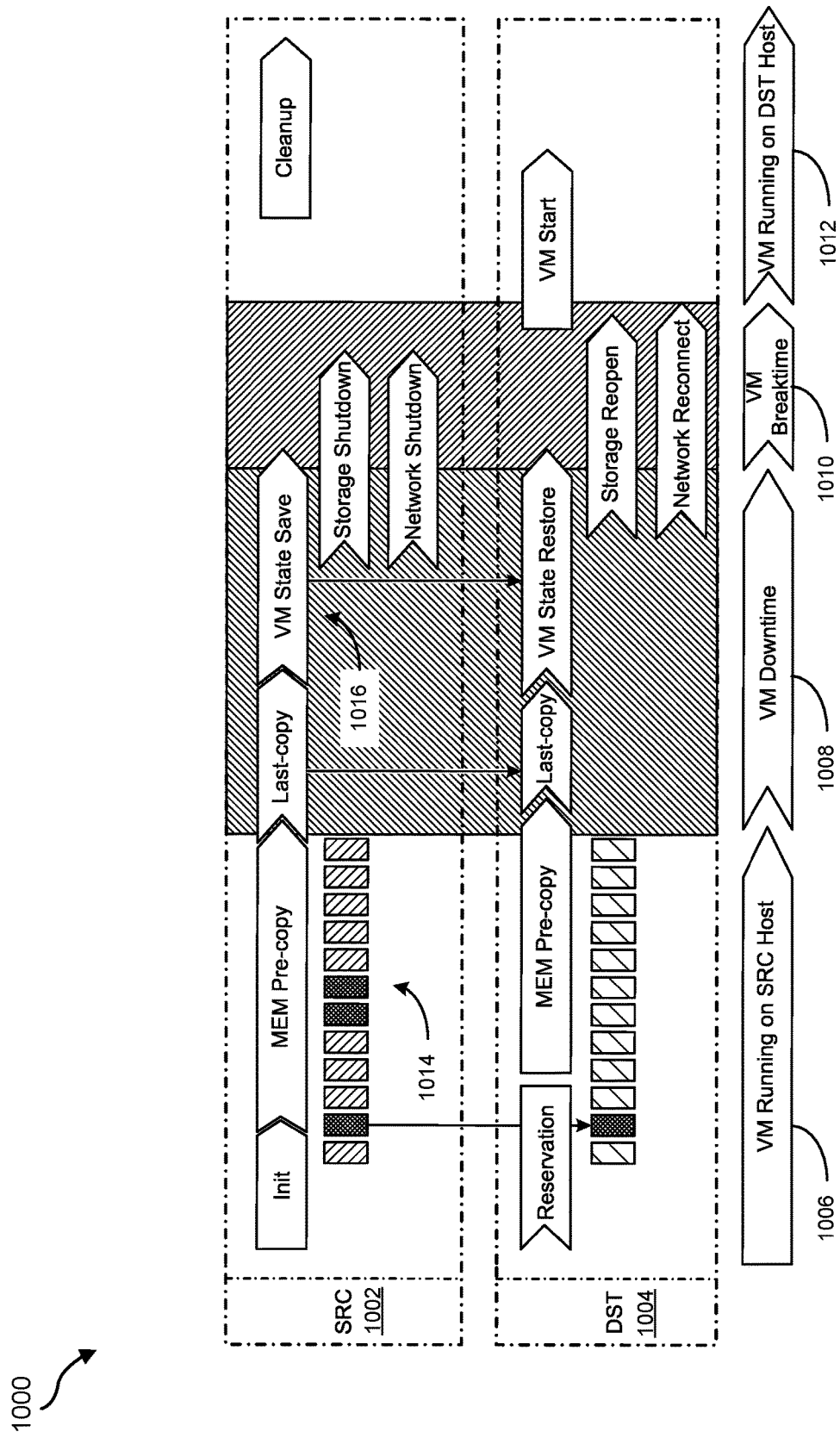
FIG. 10 is a flow diagram illustrating an example live migration sequence for a co-processing unit ensuring processing unit hardware state integrity in live migration.

FIG. 10 illustrates an example live migration sequence 1000 for a source co-processing unit 1002 and a target co-processing unit 1004. Four phases of the sequence 1000 include a first phase 1006 in which the VM is running on the source co-processing unit 1002, a second phase 1008 corresponding to VM downtime, a third phase 1010 corresponding to VM breaktime, and a fourth phase 1012 in which the VM is running on the target co-processing unit 1004. For example, during the first phase 1006, memory copies 1014 (e.g., application states, secure network channels, algorithms, etc.) can be collected for migration from a VM of the source co-processing unit 1002 to a VM of the target co-processing unit 1004. Additionally, during the second phase, last memory copies can be collected and the VM state, including a device state of the source co-processing unit 1002, can be collected at 1016 for migration from the VM of the source co-processing unit 1002 to the VM of the target co-processing unit 1004. The collection of the device state of the source co-processing unit 1002 at 1016 can be a final step of live migration data collection for inclusion in the package. By injecting, at the source co-processing unit 1002, one or more integrity signatures for the device state of the source co-processing unit 1002 into the live migration data package, the target co-processing unit 1004 can check the integrity of the received device state of the source co-processing unit 1002 and restore it safely on the destination co-processing unit in the second phase 1008, and/or third phase 1010 of sequence 1000.

Figure 11:
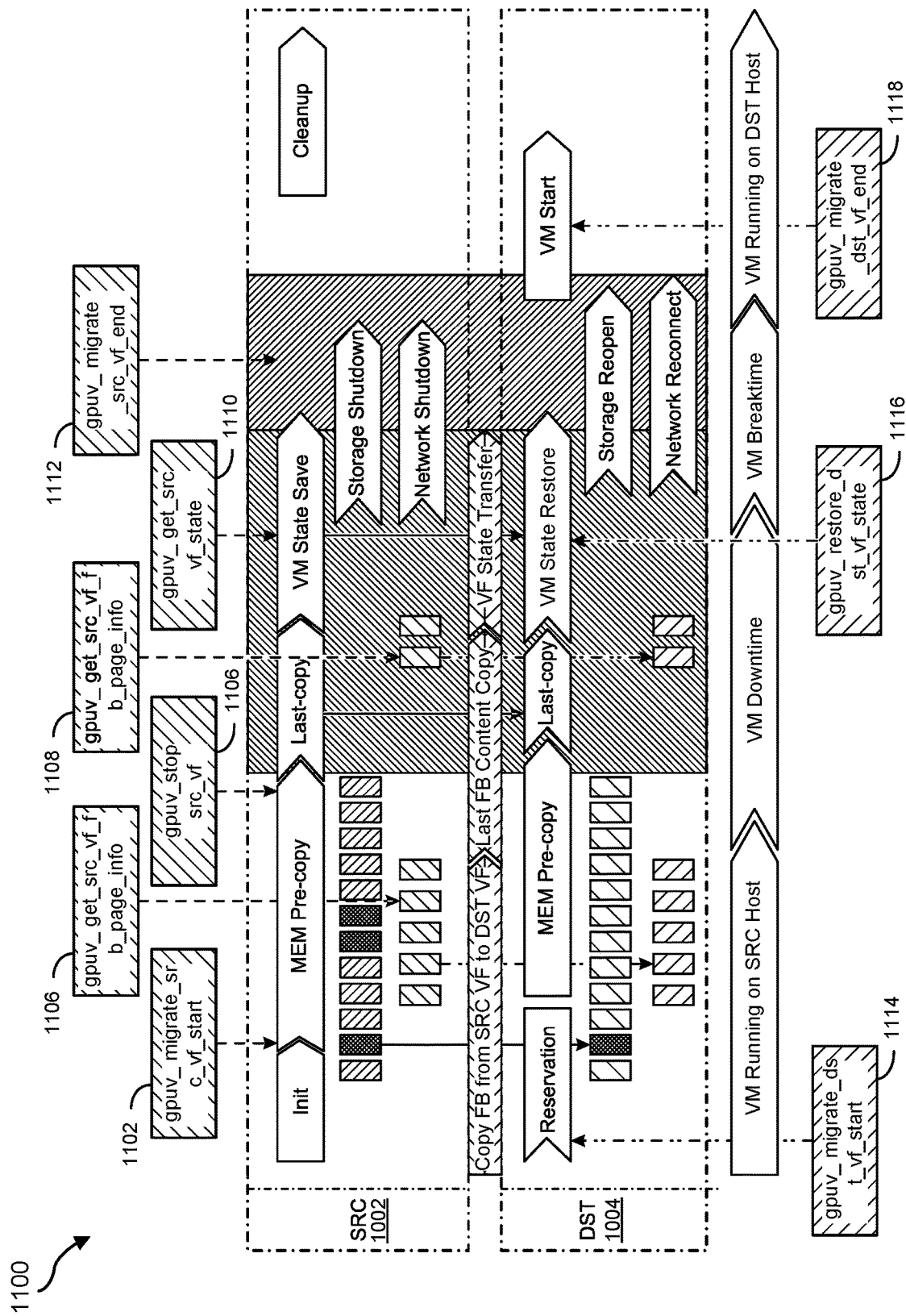
FIG. 11 is a flow diagram illustrating an example live migration sequence for a guest virtual machine ensuring processing unit hardware state integrity in live migration.

FIG. 11 illustrates an example live migration sequence 1100 for a guest virtual machine ensuring processing unit hardware state integrity in live migration. Live migration sequence 1100 can include all of the procedures carried out by source co-processing unit 1002 and a target co-processing unit 1004 of FIG. 10. Live migration sequence 1100 exhibits various requests 1102-1118 that can be transmitted by host drivers to source co-processing unit 1002 and a target co-processing unit 1004 in order to trigger various source mode and target mode procedures that can be performed in any manner described herein. For example, any or all of requests 1102-1110 can trigger outport migration procedures to be performed by source co-processing unit 1002, and any or all of requests 1114-1118 can trigger import migration procedures to be performed by target co-processing unit 1004. In this context, a source VF state save request 1110 can trigger the source co-processing unit 1002 to collect and sign data blobs that include the device state of the source co-processing unit 1002. This source VF state save request 1110 can identify a storage location at which the source co-processing unit can save the live migration data package containing the device state of the source co-processing unit 1002. Alternatively or additionally, any or all of the requests 1102-1108 can identify the storage location at which the source co-processing unit 1002 can save the live migration data package containing the device state of the source co-processing unit 1002. Likewise, a target VF state restore request 1116 can trigger the target co-processing unit 1004 to verify the signed data blobs that include the device state of the source co-processing unit 1002. This target VF state restore request 1116 can identify a storage location at which the target co-processing unit 1004 can access the live migration data package containing the device state of the source co-processing unit 1002. Alternatively or additionally, request 1114 can identify the storage location at which the target co-processing unit can access the live migration data package containing the device state of the source co-processing unit 1002.

Figure 12:
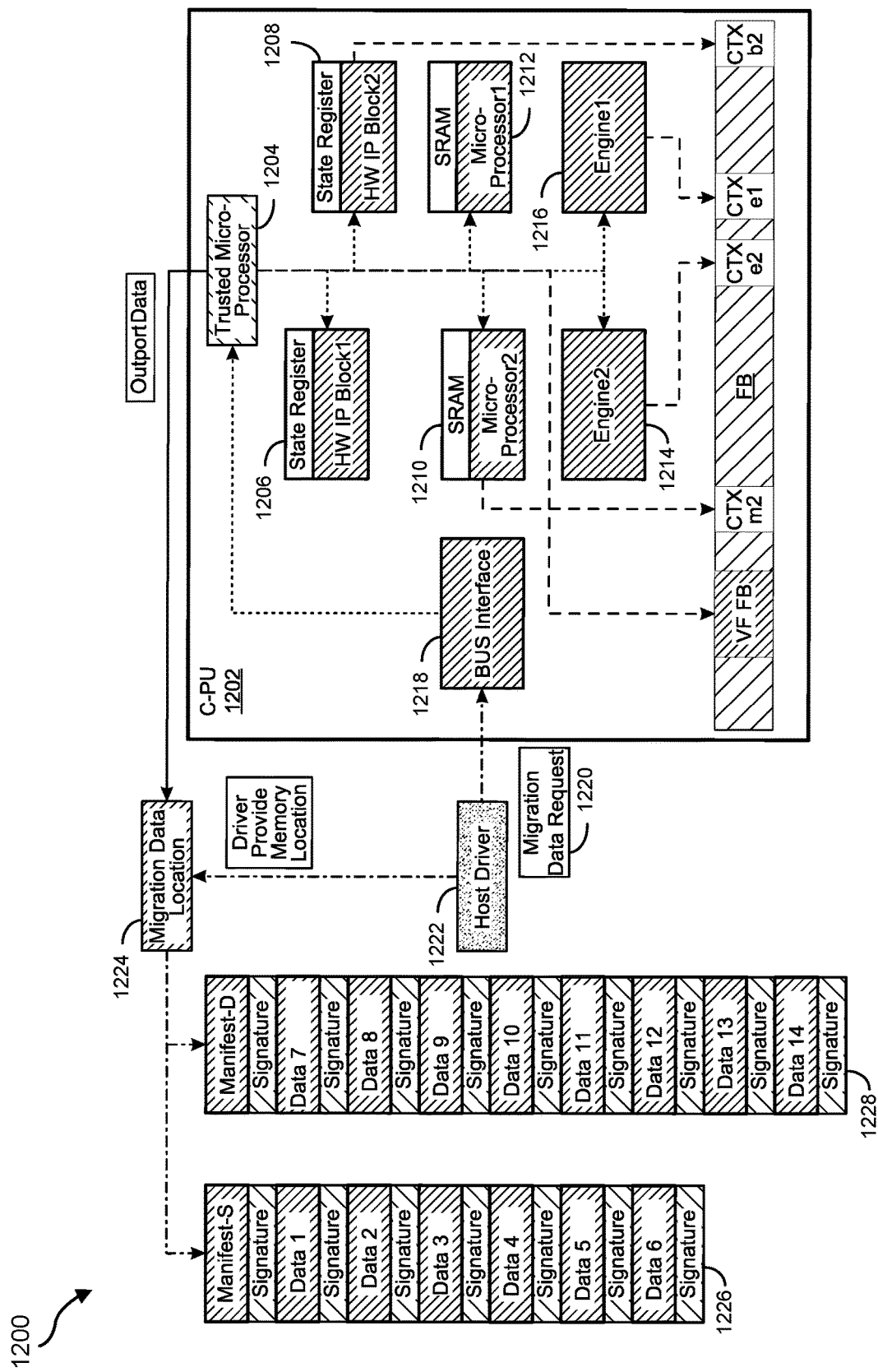
FIG. 12 is a block diagram illustrating an example outport of live migration data by a source co-processing unit ensuring processing unit hardware state integrity in live migration.

FIG. 12 illustrates an example outport 1200 of live migration data by a source co-processing unit 1202 ensuring processing unit hardware state integrity in live migration. For example, source co-processing unit 1202 can have a trusted micro-processor 1204 connected to state registers 1206 and 1208, SRAM 1210 and 1212, engines 1214 and 1216, and a bus interface 1218. Trusted micro-processor 1204 can receive a trigger 1220 from host driver 1222 over bus interface 1218 that provides a migration data location 1224. The trusted micro-processor 1204 can collect data blobs representing a state of the source co-processing unit 1202 from a frame buffer FB of the source co-processing unit 1202 state registers 1206 and 1208, internal SRAM 1210 and 1212, and/or engines 1214 and 1216. Example data blobs can include VF frame buffer, one or more instances of co-processing unit state data (e.g., context), such as RAM and or engine data, and/or any other type of data blob disclosed herein. The trusted micro-processor 1204 can generate signatures for the data blobs and store the data blobs in manifests 1226 and 1228 paired (e.g., concatenated) with their respective signatures.

Figure 13:
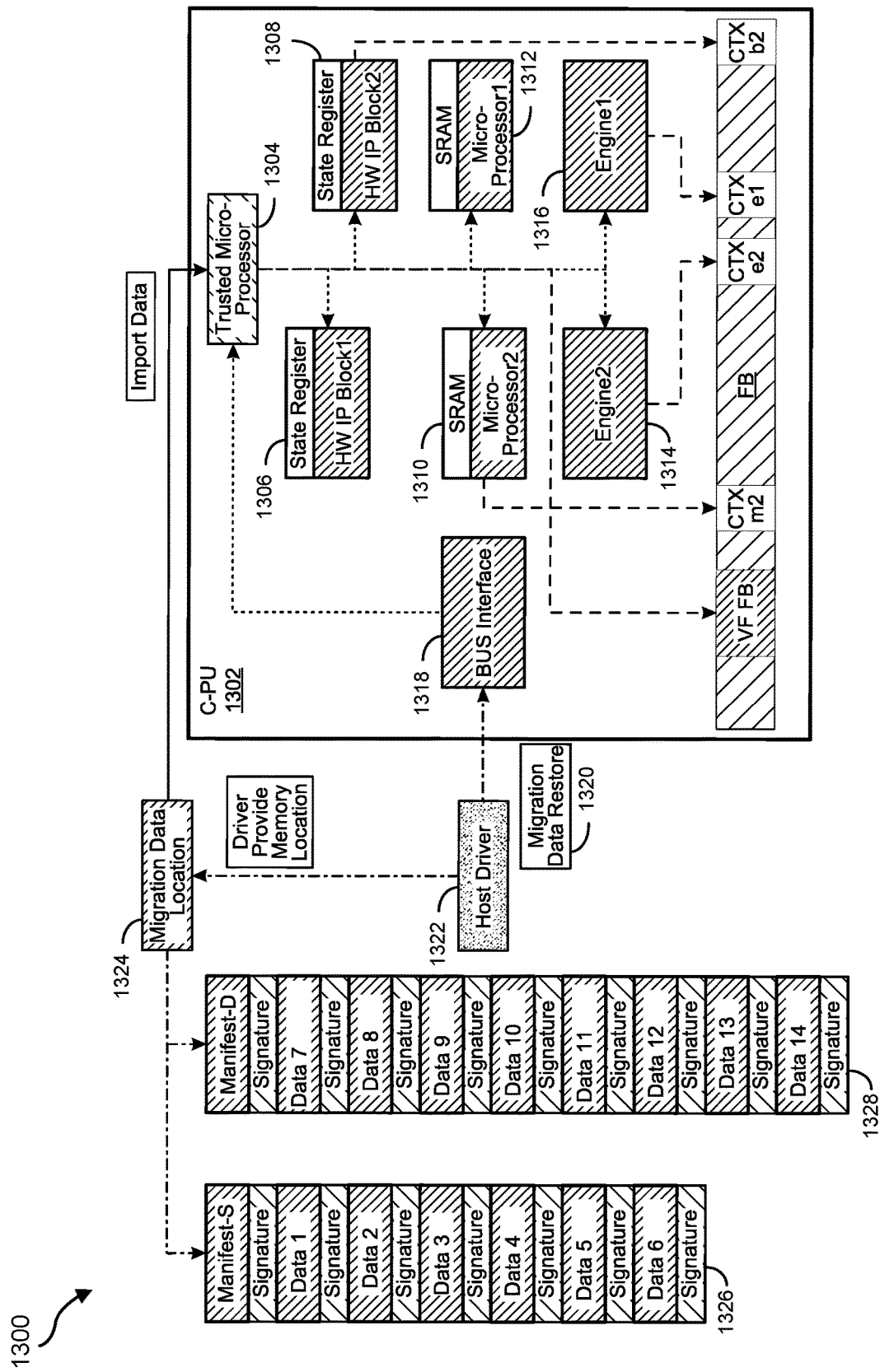
FIG. 13 is a block diagram illustrating an example import of live migration data by a target co-processing unit ensuring processing unit hardware state integrity in live migration.

FIG. 13 illustrates an example import 1300 of live migration data by a target co-processing unit 1302 ensuring processing unit hardware state integrity in live migration. For example, target co-processing unit 1302 can have a trusted micro-processor 1304 connected to state registers 1306 and 1308, SRAM 1310 and 1312, engines 1314 and 1316, and a bus interface 1318. Trusted micro-processor can receive a trigger 1320 from host driver 1322 over bus interface 1318 that provides a migration data location 1324. The trusted micro-processor 1304 can access the migration data location 1324 and retrieve signed data blobs (e.g., from manifests 1326 and 1328) representing a state of a source co-processing unit (e.g., source co-processing unit 1202 of FIG. 12). Trusted micro-processor 1304 can use the signatures to verify the respective data blobs with which they are paired and restore the state of the source co-processing unit on the target co-processing unit 1302. This restoration can entail loading, by the trusted micro-processor 1304, the data blobs into the frame buffer FB, state registers 1306 and 1308, internal SRAM 1310 and 1312, and/or engines 1314 and 1316 and starting the VM.

As set forth above, the disclosed systems and methods can ensure processing unit hardware state integrity in live migration. For example, the disclosed systems and methods can ensure data integrity of co-processing unit state data transferred during live migration of a virtual function at a hardware level. For example, firmware running in a trusted micro-processor on a source co-processing unit can receive a request from a driver of the source co-processing unit to create live migration data. In response to the request, the firmware running in a trusted micro-processor can collect one or more data blobs that include co-processing unit state data to be included in a live migration data package, generate an integrity signature for each of the one or more data blobs, and inject the integrity signatures into the live migration data package. Additionally, firmware running in a trusted micro-processor in a destination co-processing unit can receive the live migration data package from a driver of the destination co-processing unit, use the integrity signatures to perform integrity checks on each of the one or more data blobs, and restore the co-processing unit state data on the destination co-processing unit in response to the integrity checks proving successful. Otherwise, a data blob that fails an integrity check can be dropped, causing the live migration to fail. A co-processing unit firmware running in a trusted micro-processor can be capable of performing as both the source co-processing unit firmware and the destination co-processing unit firmware.

The disclosed systems and methods can achieve numerous benefits. For example, the disclosed systems and methods can guarantee that all data migrated from a source co-processing unit to a destination co-processing unit is valid and will not cause any co-processing unit to hang or any security concern. The disclosed systems and methods can also guarantee the run-time context for a co-processing unit engine and execution environment are not altered during or after migration. As a result, applications that rely on the context can resume their execution without any need for re-initialization.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising:
   source mode live migration circuitry configured to participate in a live migration procedure by injecting, into a live migration data package containing a state of a processing unit implementing the source mode live migration circuitry, a signature verifying the state; and
   target mode live migration circuitry configured to participate in an additional live migration procedure migrating an additional live migration data package containing an additional state of an additional processing unit by performing an integrity check based on an additional signature, in the additional live migration data package, verifying the additional state.

2. The computing device of claim 1, wherein the source mode live migration circuitry is configured to:
   receive a request, from a host driver, to create the live migration data package;
   collect, in response to the request, one or more data blobs that include the state of the processing unit;
   generate integrity signatures including an integrity signature for each of the one or more data blobs; and
   inject the integrity signatures into the live migration data package.

3. The computing device of claim 1, wherein the target mode live migration circuitry is configured to participate in the additional live migration procedure by:

receiving, from a host driver, the additional live migration data package; and respond to receipt of the additional live migration data package by performing the integrity check of the additional state of the additional processing unit based on the additional signature injected, by the additional processing unit, into the additional live migration data package.

4. The computing device of claim 3, wherein the target mode live migration circuitry is configured to participate in the additional live migration procedure by restoring, based on the integrity check, the additional state of the additional processing unit on the processing unit.

5. The computing device of claim 1, wherein the target mode live migration circuitry is configured to restore the state of the additional processing unit on the processing unit in response to the integrity check proving successful.

6. The computing device of claim 1, wherein the target mode live migration circuitry is configured to drop a data blob of the additional live migration data package that fails the integrity check, thereby causing restoration of the state of the additional processing unit on the processing unit to fail.

7. The computing device of claim 1, wherein the computing device corresponds to at least one of:
the processing unit; or
one or more micro-processors configured for implementation in the processing unit.

8. A server system, comprising:
a co-processing unit configured to participate as a source in a live migration procedure by injecting a signature, into a live migration data package containing a state of the co-processing unit, verifying the state and participate as a target in an additional live migration procedure by performing an integrity check based on an additional signature, verifying an additional state of an additional co-processing unit, in an additional live migration data package; and
a host driver configured to trigger the co-processing unit to participate as the source by transmitting a request to create the live migration data package and trigger the co-processing unit to participate as the target by transmitting the additional live migration data package.

9. The server system of claim 8, wherein the co-processing unit is configured to participate as the source by:
collecting, in response to the request, one or more data blobs that include the state of the co-processing unit;
generating integrity signatures including an integrity signature for each of the one or more data blobs; and
injecting the integrity signatures into the live migration data package.

10. The server system of claim 8, wherein the co-processing unit is configured to participate as the target by performing the integrity check, in response to receipt of the additional live migration data package, of the additional state of the additional co-processing unit based on the additional signature injected, by the additional co-processing unit, into the additional live migration data package.

11. The server system of claim 10, wherein the co-processing unit is configured to participate as the target by restoring, based on the integrity check, the additional state of the additional co-processing unit on the co-processing unit.

12. The server system of claim 8, wherein the co-processing unit is configured to participate as the target by restoring the state of the additional co-processing unit on the co-processing unit in response to the integrity check proving successful.

13. The server system of claim 8, wherein the co-processing unit is configured to participate as the target by dropping a data blob of the additional live migration data package that fails the integrity check, thereby causing restoration of the state of the additional co-processing unit on the co-processing unit to fail.

14. A computer-implemented method comprising:
participating as a source, by a processing unit, in a live migration procedure by injecting, into a live migration data package containing a state of the processing unit, a signature verifying the state; and
participating as a target, by the processing unit, in an additional live migration procedure migrating an additional live migration data package containing an additional state of an additional processing unit by performing an integrity check based on an additional signature, in the additional live migration data package, verifying the additional state.

15. The computer-implemented method of claim 14, wherein participating as the source includes:
receiving a request, from a host driver, to create the live migration data package;
collecting, in response to the request, one or more data blobs that include the state of the processing unit;
generating integrity signatures including an integrity signature for each of the one or more data blobs; and
injecting the integrity signatures into the live migration data package.

16. The computer-implemented method of claim 14, wherein participating as the target includes:
receiving, from a host driver, the additional live migration data package; and
performing the integrity check, in response to receipt of the additional live migration data package, of the additional state based on the additional signature injected, by the additional processing unit, into the additional live migration data package.

17. The computer-implemented method of claim 16, wherein participating as the target includes restoring, based on the integrity check, the additional state of the additional processing unit on the processing unit.

18. The computer-implemented method of claim 14, wherein participating as the target includes restoring the state of the additional processing unit on the processing unit in response to the integrity check proving successful.

19. The computer-implemented method of claim 14, wherein participating as the target includes dropping a data blob of the additional live migration data package that fails the integrity check, thereby causing restoration of the state of the additional processing unit on the processing unit to fail.

20. The computer-implemented method of claim 14, wherein the processing unit corresponds to a co-processing unit.

* * * * *